United States Patent [19]

Erdman

[11] Patent Number: 4,709,837

[45] Date of Patent: Dec. 1, 1987

[54] FILTER ASSEMBLY FOR DRY POWDER FILLING MACHINE

[75] Inventor: George R. Erdman, Harrisonburg, Va.

[73] Assignee: Merck & Co., Inc., Rahway, N.J.

[21] Appl. No.: 605,745

[22] Filed: May 1, 1984

[51] Int. Cl.[4] .............................................. A01N 17/08

[52] U.S. Cl. .................................... 222/636; 222/189; 222/368; 425/405 R; 425/437; 425/812

[58] Field of Search ............... 222/189, 368, 370, 636, 222/335, 306–308; 141/12, 67, 71, 286, 242, 144, 146; 73/863.23, 863.25; 55/467, 518; 210/446, 451; 604/405, 406; 131/111, 115; 425/405 R, 405 H, 437, 812, 199, 197

[56] References Cited

U.S. PATENT DOCUMENTS

| | | | |
|---|---|---|---|
| 2,513,143 | 6/1950 | Carter | 141/51 |
| 2,540,059 | 1/1951 | Stirn et al. | 222/368 |
| 2,670,101 | 2/1954 | Heisterkamp et al. | 222/189 |
| 2,728,943 | 1/1956 | Hertz et al. | 425/197 |
| 2,890,066 | 6/1959 | Kerr | 285/325 |
| 3,312,152 | 4/1967 | Williamson | 141/144 |
| 4,371,101 | 2/1983 | Cane et al. | 222/636 |

FOREIGN PATENT DOCUMENTS

| | | | |
|---|---|---|---|
| 91061 | 2/1962 | Denmark | 210/446 |

*Primary Examiner*—H. Grant Skaggs
*Attorney, Agent, or Firm*—Samuel B. Abrams

[57] ABSTRACT

The present application discloses an improved filter assembly used in a dry powder filling machine in which the bottom of the cylindrical measuring cavity for the powder being measured is formed by the improved filter assembly having a cup shaped recess wherein the floor of the recess contains evenly spaced and relatively small apertures. The aperture-containing floor is backed by a screen which allows vacuum to be applied to draw powder into the cavity but which prevents passage of the powder through the screen while the cavity is being filled. Application of gas pressure to the underside of the floor of the cavity expels the measured powder into a container as a discrete slug with relatively little separation.

1 Claim, 4 Drawing Figures

Fig.1.
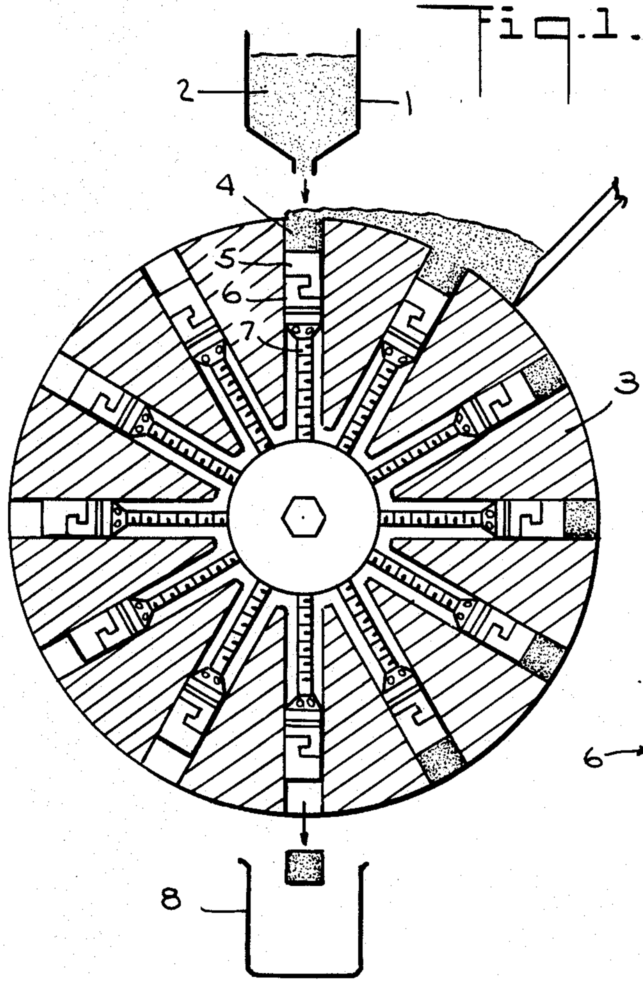
Fig.2.
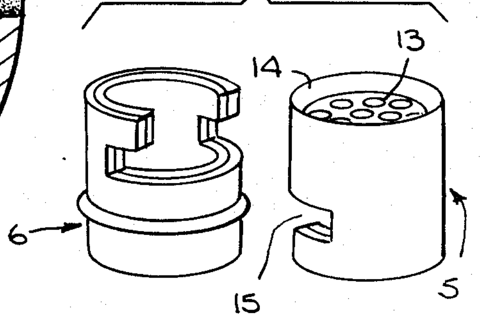
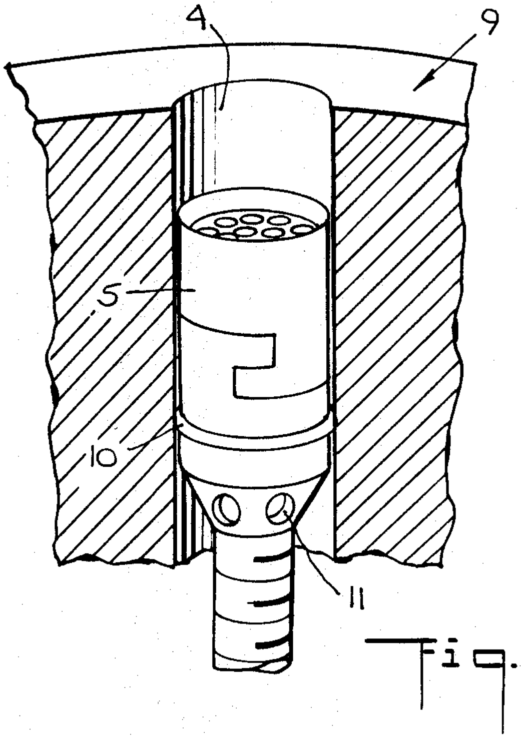
Fig.3.
Fig.4.
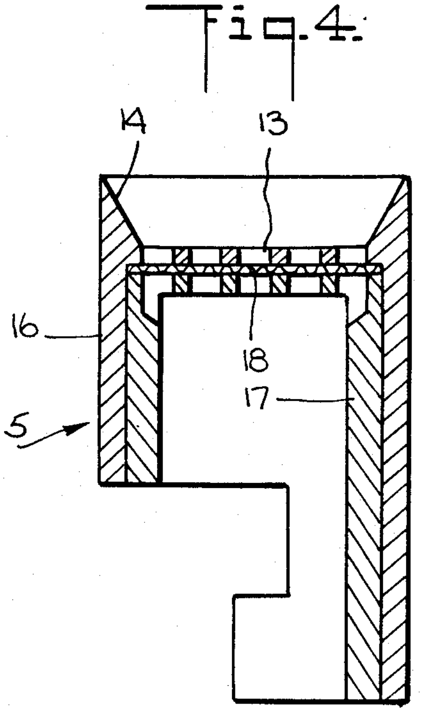

FILTER ASSEMBLY FOR DRY POWDER FILLING MACHINE

BACKGROUND OF THE INVENTION

In the pharmaceutical industry there is a need to volumetrically measure small volumes of powdered solids and to fill them into individual vials for later constitution with sterile liquid materials and injection of the resulting solution into patients needing treatment. In one method of carrying out the filling of vials with dry solids, there is provided a device comprising a filling wheel having a series of radially aligned cylindrical measuring cavities with the open end facing the circumference of said filling wheel. The volume of the measuring cavity is controlled by a filter assembly which forms the bottom of the measuring cavity. The filter assembly is coupled to a hollow, adjustable cylinder connected by a threaded stem to the filling wheel hub permitting adjustment of the position of the filter assembly in the measuring cavity. The filter assembly comprises a molded nylon cylinder slidably enclosed in said measuring cavity, coupled at one end to said adjustable cylinder and closed at the other end by a fine mesh nylon screen heat sealed thereto, said nylon screen forming the bottom of the measuring cavity. The nylon screen has openings small enough to prevent passage of powdered solid but large enough to permit gas flow.

As the wheel rotates, the open end of the cavity is positioned under a filling hopper and simultaneously vacuum is applied through the hub to the filter assembly to draw the powder into the cavity. As the wheel continues to rotate, a suitable receptacle is positioned under the open end of the filled cavity and nitrogen pressure is applied to the filter and to expel the measured amount of powder in the receptacle. However, the prior art filter assembly caused a relatively high failure rate in that an unacceptable variation in the amount of delivered product occurred. It is believed that this failure is caused by the uneven packing of solids in the cavity resulting from the uneven distribution of gas flow.

DESCRIPTION OF THE INVENTION

The subject invention comprises an improved filter assembly for use in a powder filling machine of the type that uses a rotary filling wheel having radially disposed cylindrical measuring cavities wherein the volume of said measuring cavities is controlled by a filter assembly which forms the adjustable bottom of the measuring cavity.

The filter assembly consists of an outer shell, an inner shell, and a stainless steel screen, said outer shell preferably of stainless steel construction in the shape of a hollow cylinder having one end formed with a key type structure for coupling with an adjustable cylinder and having the other end closed by a recessed perforated end plate integral with the cylinder and forming a concave or cup-shaped bottom of the measuring cavity. Said inner shell is a stainless steel cylinder slidably enclosed within said outer cylinder which holds in place a fine mesh stainless steel screen preferably having openings of approximately 0.001 inches in diameter. Said screen is formed as a flat, circular piece which is closely fitted to the walls of the outer shell.

This new filter assembly design provides a concave shaped bottom of the measuring cavity in a rotary wheel filling machine in place of the prior art filter assembly wherein the bottom of the measuring cavity is a flat screen.

The improved design of the filter assembly having recessed evenly spaced apertures backed by a stainless steel screen and sloping sides allows the powder to be drawn into the measuring cavity and ejected as a single slug of accurately measured volume with substantially no failures. Thus, the filling equipment can be operated with greater efficiency than when using the prior art assembly resulting in a saving of valuable product and greatly improved economy.

DESCRIPTION OF THE DRAWING

FIG. 1 is a cut away view showing the operation of a filling wheel in a dry powder filling machine.

FIG. 2 is a perspective view of a filter assembly and an adjustable cylinder and key type coupling means.

FIG. 3 is a cut away view of one measuring cavity showing a filter assembly coupled in operating position.

FIG. 4 is a cut away view of the improved filter assembly showing the outer shell with perforated recessed end, screen, and inner shell.

OPERATION OF DEVICE

In utilizing applicants' filter assembly in a filling machine manufactured by Perry Industries Inc., a rotary filling wheel shown in FIG. 1 rotates under filling hopper 1 containing dry powder 2 and is filled into cavity 4 at the point when positioned under the filling hopper. At the same time, vacuum is supplied to the filter assembly 5 through gas ports 11 shown in FIG. 3. The filling wheel is then rotated in a clockwise direction and maintained under vacuum until the measuring cavity is positioned over receiving container 8 at which point an inert gas under pressure is supplied to the underside of the filter assembly perforated end plate 13 thereby ejecting the dry powder retained in the fill cavity 4 as a single slug into receiving container 8. Each of the fill cavities in turn are filled under vacuum in turn and expelled under pressure by a timed sequence of valves individually supplying vacuum and pressure to the filter assembly at the appropriate time.

As shown in FIG. 4, the complete filter assembly 5 ready for installation, includes an outer cylindrical shell 16 closed at one end by an integrally attached circular end plate 13 recessed within said cylinder, said end plate joined the inner walls of said cylinder at the base of the recess formed by the sloping inner wall 14 of said outer shell, thereby forming a concave recess at the base of the fill cavity 4 shown in FIGS. 1 and 3. The end plate is perforated with evenly spaced perforations and is backed by a circular stainless steel screen 18 held in place by an inner cylindrical shell 17.

Element 3 in FIG. 1 designates the filling wheel body. Element 9 in FIG. 3 designates the outer surface of said filling wheel. Element 6 in the figures designates an adjustable cylinder having (1) a key type structure at one end for coupling with the key opening 15 is said filler assembly 5 and (2) a flange 10 at the other end which permits said cylinder 6 to be seated is the gas conduit 7.

What is claimed is:

1. In a dry powder filling machine using a rotary wheel filling mechanism having at least one radially disposed volume adjustable cylindrical filling cavity comprising an outer shell, an inner shell and a small mesh circular screen, said outer shell consisting of a cylinder open at one end and an integrally formed recessed end plate having regularly spaced small perforations at the other end, said other end of the outer shell cylinder having an anmular sloping inner wall surface that slopes inwardly from an outer edge of the other end to an inner edge of the sloping surface, said end plate being joined to the outer shell cylinder adjacent the inner edge of the sloping surface wherein said small mesh circular sceen is sandwiched between the surface of said end plate not facing the open end of said cylinder and said inner shell.

* * * * *